(12) United States Patent
Boenapalli et al.

(10) Patent No.: US 11,275,620 B2
(45) Date of Patent: Mar. 15, 2022

(54) EFFICIENT UTILIZATION OF TURBO-WRITE BUFFERS

(71) Applicant: QUALCOMM Incorporated, San Diego, CA (US)

(72) Inventors: Madhu Yashwanth Boenapalli, Hyderabad (IN); Surendra Paravada, Hyderabad (IN); Sai Praneeth Sreeram, Anantapur (IN)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 16/824,338

(22) Filed: Mar. 19, 2020

(65) Prior Publication Data

US 2021/0294654 A1  Sep. 23, 2021

(51) Int. Cl.
| | | |
|---|---|---|
| *G06F 12/02* | (2006.01) | |
| *G06F 3/06* | (2006.01) | |
| *G06F 9/50* | (2006.01) | |
| *G06F 9/54* | (2006.01) | |
| *G06F 9/30* | (2018.01) | |
| *G06F 11/34* | (2006.01) | |
| *G06F 12/123* | (2016.01) | |
| *G06F 9/46* | (2006.01) | |

(52) U.S. Cl.
CPC .......... *G06F 9/5016* (2013.01); *G06F 3/0613* (2013.01); *G06F 3/0644* (2013.01); *G06F 3/0656* (2013.01); *G06F 3/0679* (2013.01); *G06F 9/30032* (2013.01); *G06F 9/467* (2013.01); *G06F 9/544* (2013.01); *G06F 11/3452* (2013.01); *G06F 12/0246* (2013.01); *G06F 12/123* (2013.01); *G06F 2201/88* (2013.01); *G06F 2212/7203* (2013.01); *G06F 2212/7208* (2013.01)

(58) Field of Classification Search
None
See application file for complete search history.

(56) References Cited

U.S. PATENT DOCUMENTS

| | | | | |
|---|---|---|---|---|
| 2012/0096225 A1* | 4/2012 | Khawand | ............ | G06F 12/0848 711/119 |
| 2017/0090759 A1* | 3/2017 | Ioannou | ................ | G06F 3/0679 |
| 2020/0201546 A1* | 6/2020 | Yang | ..................... | G06F 3/0655 |
| 2021/0034536 A1* | 2/2021 | Kim | ..................... | G06F 12/0882 |

FOREIGN PATENT DOCUMENTS

KR   10-2021-0016184   *   2/2021   ............. G06F 12/02

OTHER PUBLICATIONS

Translation of KR 10-2021-0016184. (Year: 2021).*

* cited by examiner

*Primary Examiner* — Nathan Sadler
(74) *Attorney, Agent, or Firm* — Seyfarth Shaw LLP/Qualcomm Incorporated

(57) ABSTRACT

A method of shuffling turbo-write buffers of a universal flash storage system is described. The method includes periodically determining a performance index of each turbo-write buffer allocated to a unique logical unit number of the universal flash storage system. The method also includes shifting a position of at least two of the turbo-write buffers according to the performance index of each of the turbo-write buffers and a threshold performance level.

19 Claims, 10 Drawing Sheets

Initially SLC-Buffer

| SLC-0 Rank-1 | SLC-1 Rank-1 | SLC-2 Rank-1 | SLC-3 Rank-1 | SLC-4 Rank-1 | SLC-5 Rank-1 | SLC-6 Rank-1 |
|---|---|---|---|---|---|---|
| 632-0 | 632-1 | 632-2 | 632-3 | 632-4 | 632-5 | 632-6 |

After "T" SLC-Buffer
Here "T" can be Mins/Hrs/Days/Months/Years

| SLC-0 Rank-4 | SLC-1 Rank-2 | SLC-2 Rank-2 | SLC-3 Rank-1 | SLC-4 Rank-1 | SLC-5 Rank-3 | SLC-6 Rank-1 |
|---|---|---|---|---|---|---|
| 632-0 | 632-1 | 632-2 | 632-3 | 632-4 | 632-5 | 632-6 |

Modified Buffer

| SLC-3 Rank-1 | SLC-1 Rank-2 | SLC-2 Rank-2 | SLC-0 Rank-4 | SLC-5 Rank-3 | SLC-4 Rank-1 | SLC-6 Rank-1 |
|---|---|---|---|---|---|---|
| 632-3 | 632-1 | 632-2 | 632-0 | 632-5 | 632-4 | 632-6 |

*FIG. 7*

EFFICIENT UTILIZATION OF TURBO-WRITE BUFFERS

BACKGROUND

Field

The present disclosure generally relates to integrated circuits (ICs). More specifically, aspects of the present disclosure relate to an apparatus and method of efficient utilization of turbo-write buffers.

Background

Electronic devices, such as computers, smart phones, mobile devices, Internet-of-Things (IoT) devices, and other like mobile platform devices are continually driving the demand for faster data. Conventional volatile memory used in mobile platform devices may be unable to handle and facilitate the voluminous data consumed by such mobile platform devices. One option for meeting this ever expanding volume of data is using high speed non-volatile (NV) memory devices. For example, flash memory is one possible type of NV memory device that may be capable of meeting this increasing volume of data consumed by mobile platform devices.

A flash memory storage device is a type of non-volatile memory implemented using solid-state drive (SSD) technology. For example, SSD-based flash memory is an electronic non-volatile computer storage device capable of maintaining, erasing, and/or reprogramming data. Flash memory can be fabricated with several different types of integrated circuit (IC) technologies, such as a negative logical OR (NOR) gate or a negative logical AND (NAND) gate using, for example, floating-gate transistors. This flash memory can be configured for block-based, page-based, word-based, and/or byte-based memory access, depending on the type of supported applications.

The internal memories of the noted mobile platform devices may be implemented with universal flash storage (UFS). Universal flash storage or UFS is a flash storage specification for consumer electronic devices, such as mobile phones, digital cameras, and other like consumer electronic devices specifying high performance and low power consumption. Unfortunately, universal flash storage is susceptible to low write performance. Techniques for improving the write performance of universal flash storage are desired.

SUMMARY

A method of shuffling turbo-write buffers of a universal flash storage system is described. The method includes periodically determining a performance index of each turbo-write buffer allocated to a unique logical unit number of the universal flash storage system. The method also includes shifting a position of at least two of the turbo-write buffers according to the performance index of each of the turbo-write buffers and a threshold performance level.

A apparatus configured to shuffle turbo-write buffers of a universal flash storage (UFS) system is described. The apparatus includes a memory having turbo-write buffers allocated to unique logical unit numbers of the UFS system. The apparatus also includes a processor(s) coupled to the memory. The processor(s) is configured to periodically determine a performance index performance index of each of the turbo-write buffers allocated to the unique logical unit number of the universal flash storage system. The processor(s) is also configured to shift a position of at least two of the turbo-write buffers according to the performance index of each of the turbo-write buffers and a threshold performance level.

A non-transitory computer-readable medium having program code recorded thereon for shuffling turbo-write buffers of a universal flash storage system is described. The program code stored in the non-transitory computer-readable medium is executed by a processor. The non-transitory computer-readable medium includes program code periodically determine a performance index of each of the turbo-write buffers allocated to the unique logical unit number of the universal flash storage system. The non-transitory computer-readable medium also includes program code to shift a position of at least two of the turbo-write buffers according to the performance index of each of the turbo-write buffers and a threshold performance level.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily used as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

FIG. 7 is a block diagram depicting shuffling of the turbo-write buffers of the host controller and universal flash storage (UFS) system configuration of FIG. 6 to prevent deterioration of the turbo-write buffer health, according to aspects of the present disclosure.

DETAILED DESCRIPTION

Figure 1:
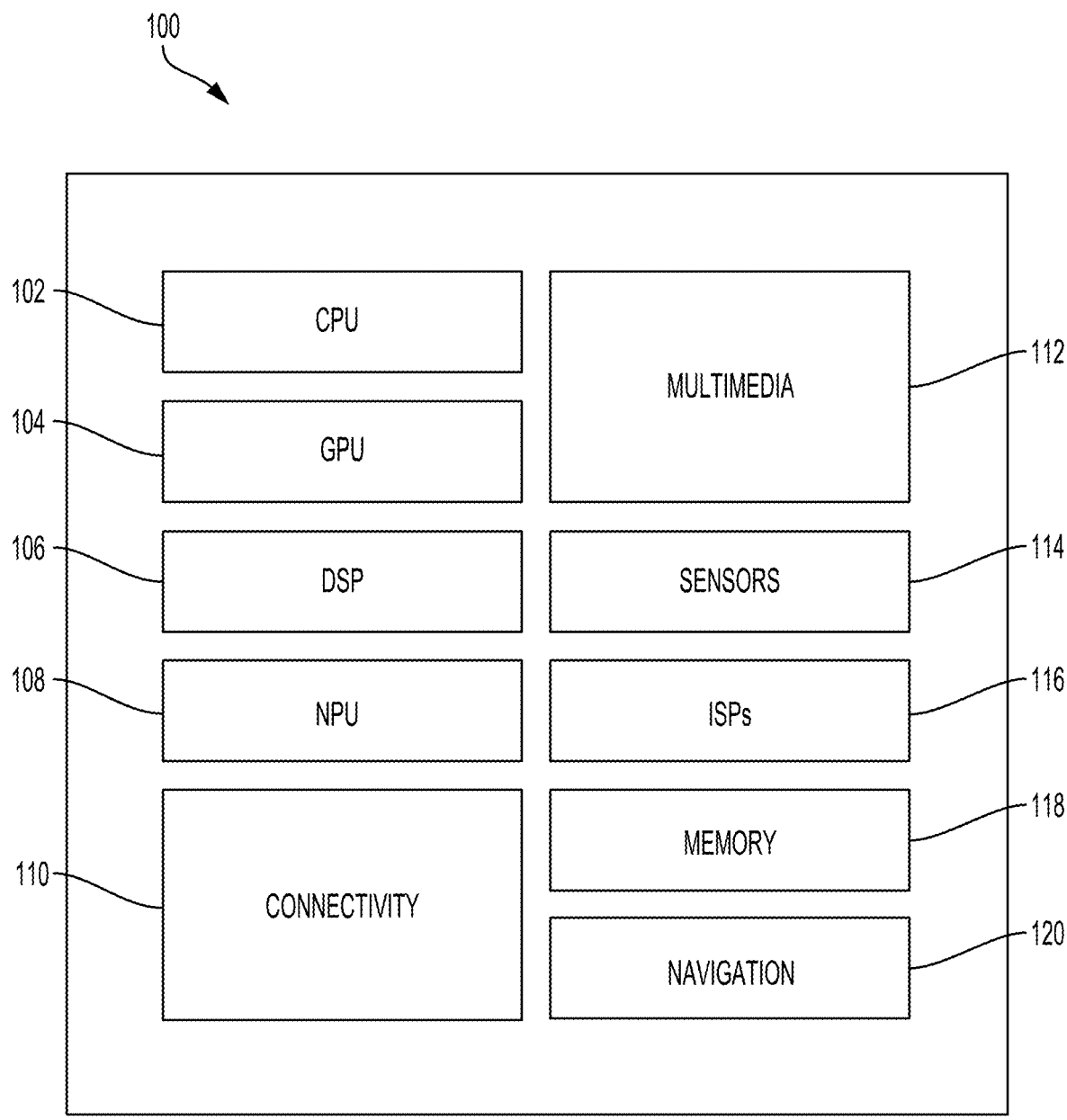
FIG. 1 illustrates an example implementation of a system-on-a-chip (SOC), including a connectivity block configured to shuffle turbo-write buffers for a universal flash storage system, in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality, in addition to or other than the various aspects of the disclosure set forth. It should be understood that any aspect of the disclosure disclosed may be embodied by one or more elements of a claim.

As described herein, the use of the term "and/or" is intended to represent an "inclusive OR", and the use of the term "or" is intended to represent an "exclusive OR". The word "exemplary" is used herein to mean "serving as an example, instance, or illustration." Any aspect described herein as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure, rather than limiting the scope of the disclosure being defined by the appended claims and equivalents thereof.

Internal memories of mobile platform devices may be implemented with universal flash storage (UFS). Universal flash storage or UFS is a flash storage specification for consumer electronic devices, such as mobile phones, digital cameras, and other like consumer electronic devices specifying high performance and low power consumption. Flash memory is a type of non-volatile memory implemented using solid-state drive (SSD) technology. For example, SSD-based flash memory is an electronic non-volatile computer storage device capable of maintaining, erasing, and/or reprogramming data.

Universal flash storage can be fabricated with several different types of integrated circuit (IC) technologies, such as a negative logical OR (NOR) gate or a negative logical AND (NAND) gate using, for example, floating-gate transistors. Unfortunately, universal flash storage is susceptible to low write performance. For example, TLC (triple-level-cell) NAND write performance is much lower than SLC (single-level-cell) NAND write performance. The lower write performance occurs because the logically defined TLC bits involve more programming steps and higher error correction probability.

To overcome the low write performance of TLC-based storage, faster SLC NAND is used as a buffer to receive data at a higher performance level. Using SLC NAND to implement a turbo-write buffer enables the write request to be processed with a lower latency and improves overall write performance. In one configuration, some portion of TLC NAND allocated for the user area is assigned as a turbo-write buffer. The data written in the turbo-write buffer can be flushed into the normal storage by an explicit host command or implicitly while in hibernate state (e.g., HIBERN8).

Various configurations of a turbo-write buffer are possible. For example, a single shared turbo-write buffer may be configured and shared by each of the logical unit numbers (LUNs) associated with a universal flash storage system. Alternatively, multiple turbo-write buffers may be configured, with each respective turbo-write buffer dedicated to a single one of the LUNs associated with the universal flash storage system.

In one aspect of the present disclosure, a turbo-write buffer is configured for each of the LUNs associated with the universal flash storage system. In this aspect of the present disclosure, each of the LUNs associated with the universal flash storage system is assigned a rank. During operation of the universal flash storage system, the turbo-write buffers are shuffled. The shuffling shifts the position of the turbo-write buffer to a different one of the LUNs associated with the universal flash storage system to enable substantially equal use of the turbo-write buffers.

FIG. 1 illustrates an example implementation of a host system-on-a-chip (SOC) 100, which includes a connectivity block 110 (e.g., a host controller) configured to shuffle turbo-write buffers for a universal flash storage system, in accordance with aspects of the present disclosure. The host SOC 100 includes processing blocks tailored to specific functions, such as a connectivity block 110. The connectivity block 110 may include fifth generation (5G) connectivity, fourth generation long term evolution (4G LTE) connectivity, Wi-Fi connectivity, USB connectivity, Bluetooth® connectivity, Secure Digital (SD) connectivity, and the like.

In this configuration, the host SOC 100 includes various processing units that support multi-threaded operation. For the configuration shown in FIG. 1, the host SOC 100 includes a multi-core central processing unit (CPU) 102, a graphics processor unit (GPU) 104, a digital signal processor (DSP) 106, and a neural processor unit (NPU) 108. The host SOC 100 may also include a sensor processor 114, image signal processors (ISPs) 116, a navigation module 120, which may include a global positioning system, and a memory 118. The multi-core CPU 102, the GPU 104, the DSP 106, the NPU 108, and the multi-media engine 112 support various functions such as video, audio, graphics, gaming, artificial networks, and the like. Each processor core of the multi-core CPU 102 may be a reduced instruction set computing (RISC) machine, an advance RISC machine (ARM), a microprocessor, or some other type of processor. The NPU 108 may be based on an ARM instruction set.

In an aspect of the present disclosure, the instructions loaded into the multi-core CPU 102 may include program code to periodically determine a performance index of each turbo-write buffer allocated to a unique logical unit number of the universal flash storage system. In addition, the instructions loaded into the multi-core CPU 102 may include program code to shift a position of at least two of the turbo-write buffers according to the performance index of each of the turbo-write buffers and a threshold performance level.

Figure 2:
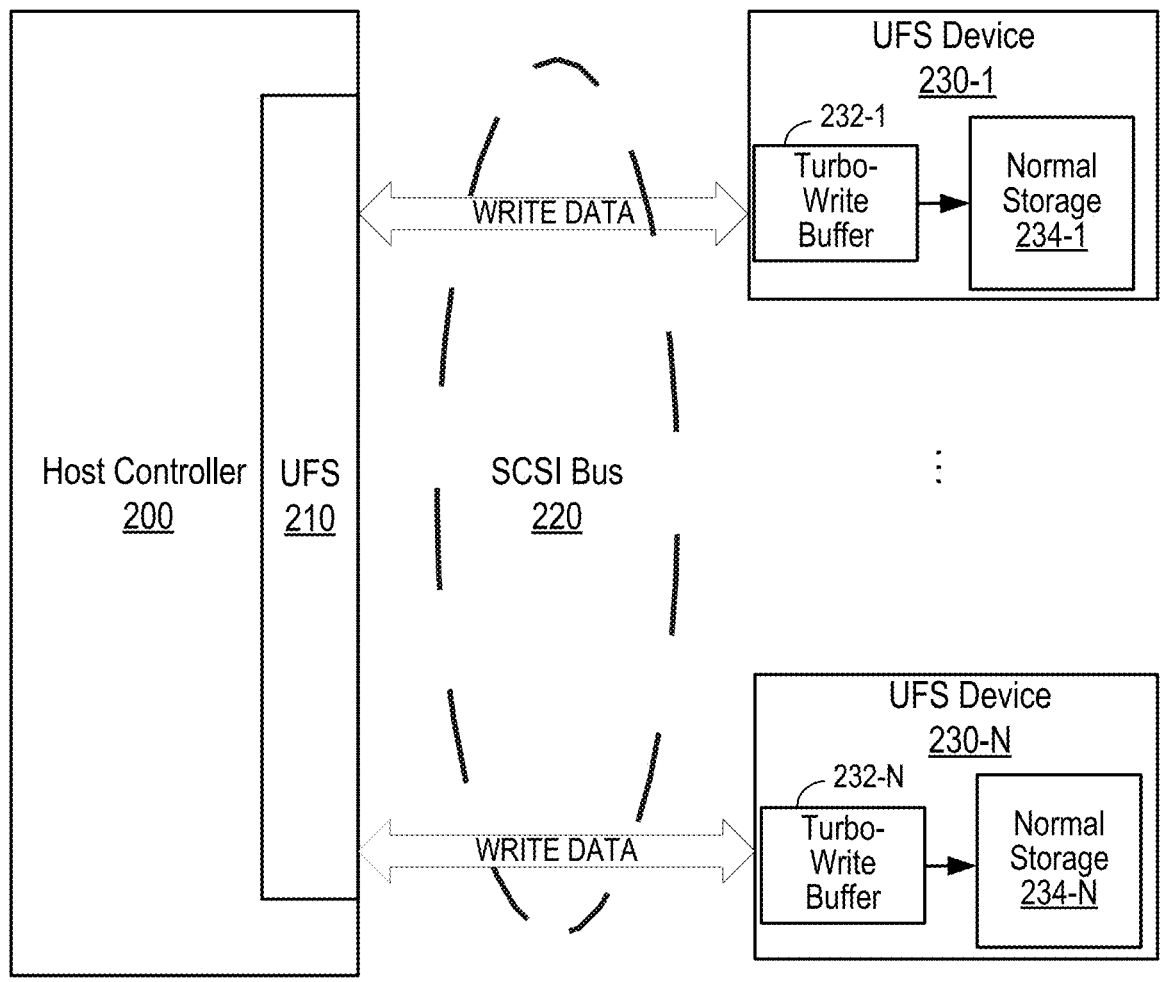
FIG. 2 shows an example implementation illustrating a host controller communicably coupled to universal flash storage (UFS) devices, in accordance with aspects of the present disclosure.

FIG. 2 is an example implementation illustrating a host controller configured to implement a turbo-write buffer for a universal flash storage (UFS) system, in accordance with aspects of the present disclosure. In this configuration, a host controller 200 may be the host SOC 100, or a block of the host SOC 100 (e.g., connectivity block 110 or other like block of the host SOC 100) including a UFS interface 210. In this example, the host controller 200 includes the UFS interface 210, configured to communicate with UFS devices 230 (230-1, . . . , 230-N) over, for example, a small computer system interface (SCSI) bus 220. The UFS devices 230 may be collectively referred to as a universal flash storage system.

As previously noted, the UFS devices 230 are susceptible to low write performance. For example, TLC (triple-level-cell) NAND write performance used to implement the normal storage 234 (234-1, . . . , 234-N) is much lower than the SLC (single-level-cell) NAND write performance. To overcome the low write performance of TLC based storage, faster SLC NAND is used to implement the turbo-write buffers 232 (232-1, . . . , 232-N). Using SLC NAND to implement the turbo-write buffers 232 enables a write request to be processed with a lower latency and improves overall write performance. In one configuration, some portion of TLC NAND allocated for the user area is assigned as the turbo-write buffers 232. The data written in the turbo-write buffers 232 can be flushed into the normal storage 234 by an explicit host command or implicitly while in hibernate state (e.g., a HIBERN8 command).

Figure 3:
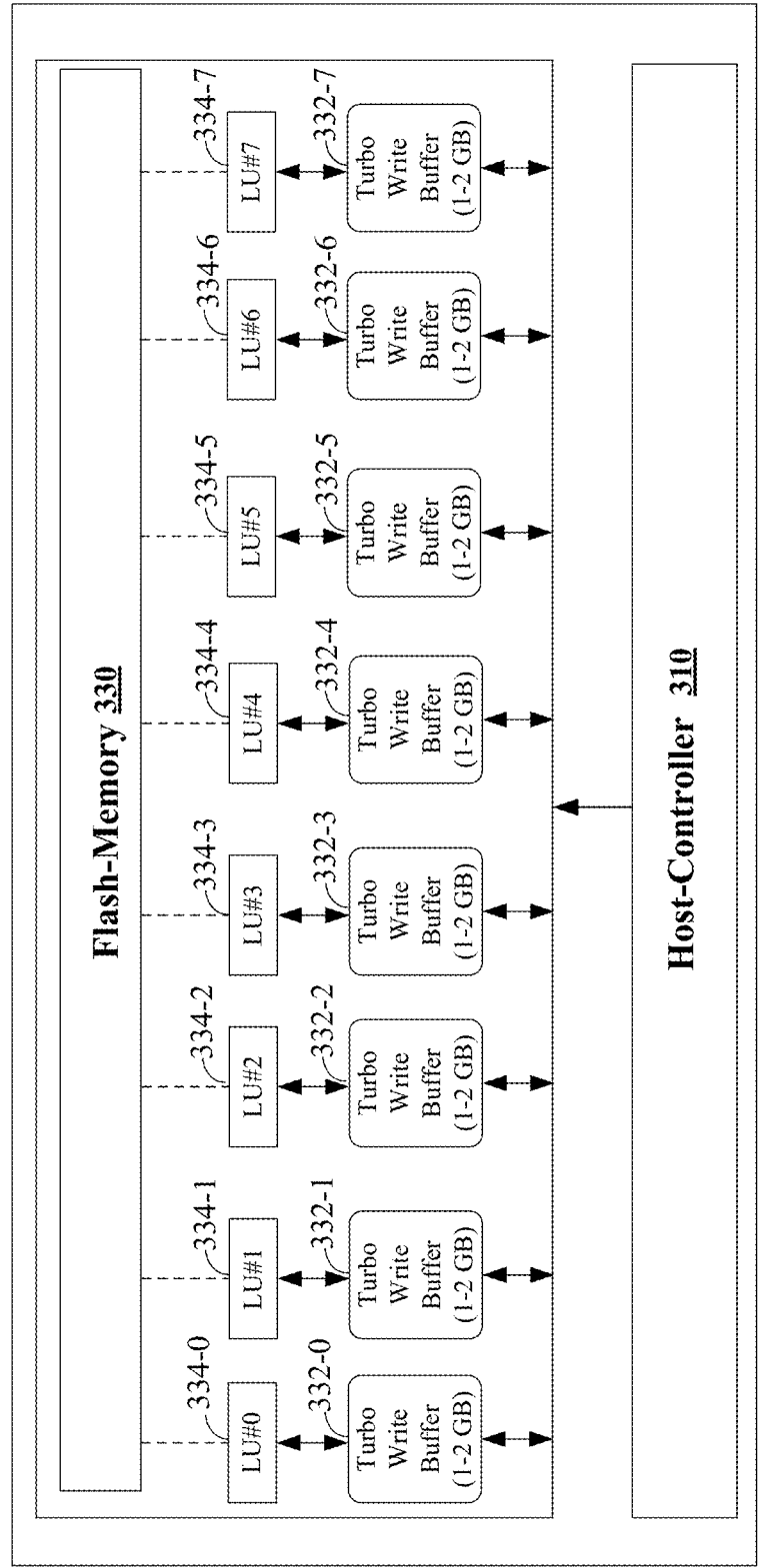
FIG. 3 is a block diagram illustrating a host controller and universal flash storage system configuration including turbo-write buffers, according to aspects of the present disclosure.

FIG. 3 is a block diagram illustrating configuration of a universal flash storage system 300 including turbo-write buffers 332 and a host controller 310, according to aspects of the present disclosure. Various configurations of a turbo-write buffer are possible. For example, multiple turbo-write buffers may be configured, with each respective turbo-write buffer dedicated to a single one of the logical unit numbers (LUNs) associated with the universal flash storage system 300. In this configuration, eight LUNs are defined (e.g., LUN #0 334-0, LUN #1 334-1, LUN #2 334-2, LUN #3 334-3, LUN #4 334-4, LUN #5 334-5, LUN #6 334-6, and LUN #7 334-7) for the universal flash storage system 330.

In addition, each one of the turbo-write buffers 332 (332-0, 332-1, . . . , 332-7) is dedicated to one of the LUNs 334 (334-0, 334-1, . . . , 334-7).

In operation, LUN #0 334-0 is the user data partition of the universal flash storage system 330, in which regular user space read/write/erase operations are handled. As a result, the turbo-write buffer 332-0 associated with the LUN #0 334-0 is used more than the other LUNs of the turbo-write buffers 332. Unfortunately, if this overuse of the turbo-write buffer 332-0 associated with the LUN #0 334-0 continues for longer than a predetermined period of time, data-decay occurs. That is, over time, the overuse decreases the data retention of the SLCs in the turbo-write buffer 332-0 corresponding to the LUN #0 334-0, as shown in FIG. 4.

Figure 4:
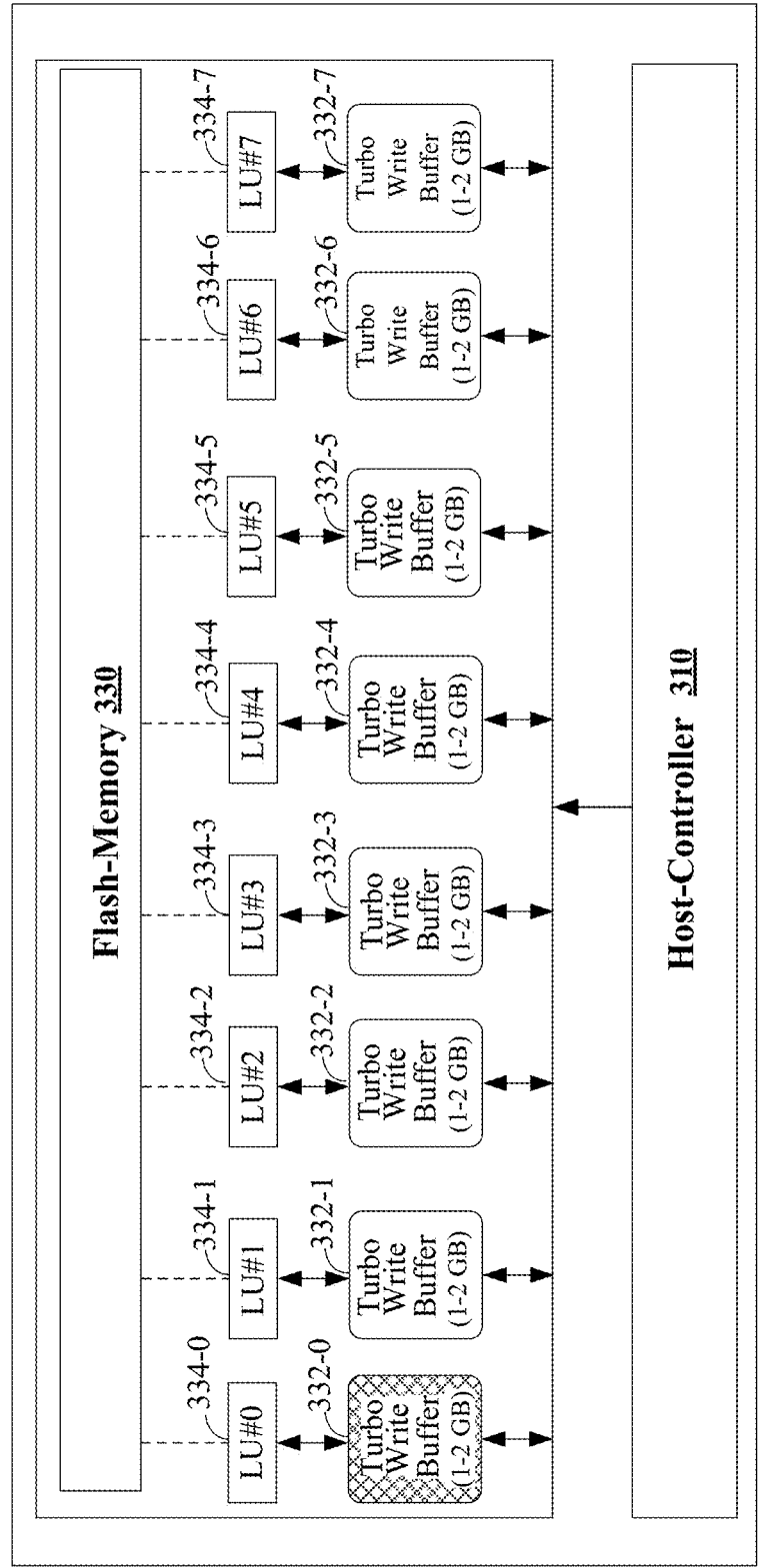
FIG. 4 is a block diagram illustrating a host controller and universal flash storage system configuration including turbo-write buffers, depicting the deterioration of the turbo-write buffer health corresponding to a user space logical unit number (LUN), according to aspects of the present disclosure.

FIG. 4 is a block diagram illustrating a universal flash storage system configuration 400 including turbo-write buffers 332 and a host controller 310, depicting the deterioration of the turbo-write buffer health corresponding to a user space logical unit number (LUN). In this example, the health of the turbo-write buffer 332-0 deteriorates and, in the long run, the advantage of using a turbo-write buffer for regular read/write operations on the user-space LUN (e.g., the LUN #0 334-0) is lost. In addition, an external temperature as well as a read disturb phenomenon may reduce the program erase (P/E) cycles of the turbo-write buffer 332-0.

Figure 5:
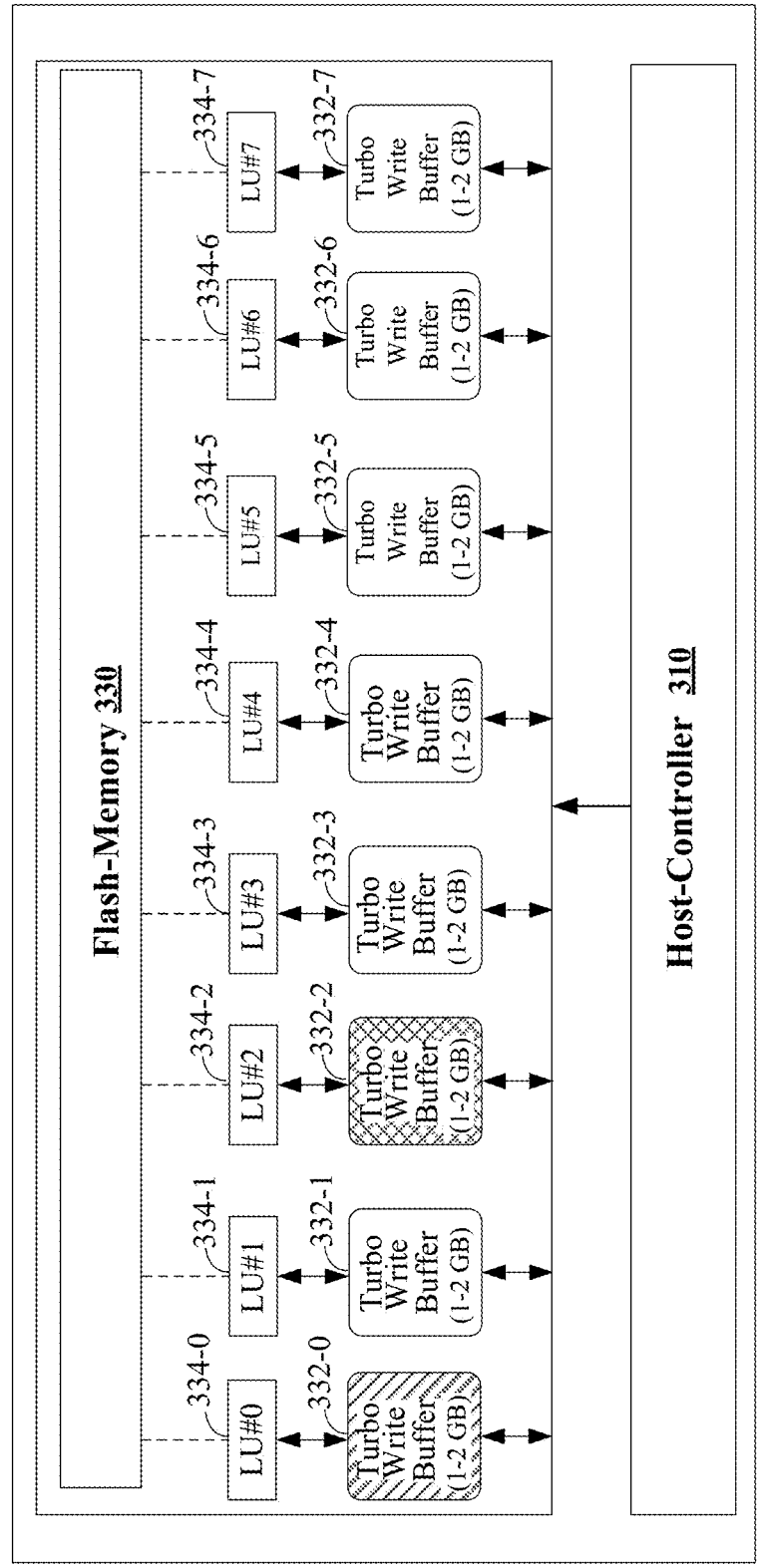
FIG. 5 is a block diagram illustrating a host controller and universal flash storage system configuration including turbo-write buffers, depicting shuffling of the turbo-write buffers to prevent deterioration of the turbo-write buffer health corresponding to a user space logical unit number (LUN), according to aspects of the present disclosure.

FIG. 5 is a block diagram illustrating a universal flash storage system configuration 500 including turbo-write buffers 332 and a host controller 310, depicting shuffling of the turbo-write buffers to prevent deterioration of the turbo-write buffer health corresponding to a user space logical unit number (LUN), according to aspects of the present disclosure. In this aspect of the present disclosure, each of the LUNs 334 associated with the universal flash storage system 330 is assigned a rank. During operation of the universal flash storage system 330, the turbo-write buffers 332 are shuffled by shifting the position of the turbo-write buffer 332 to a different one of the LUNs 334 associated with the universal flash storage system 330 to enable substantially equal use of the turbo-write buffers 332. For example, the turbo-write buffer 332-2 (e.g., least used buffer) is shuffled with the turbo-write buffer 332-0 (e.g., highest used buffer), such that the turbo-write buffer 332-2 is now associated with the LUN #0 334-0, and the turbo-write buffer 332-0 is now associated with the LUN #2 334-1, as further illustrated in FIGS. 6 and 7.

Figure 6:
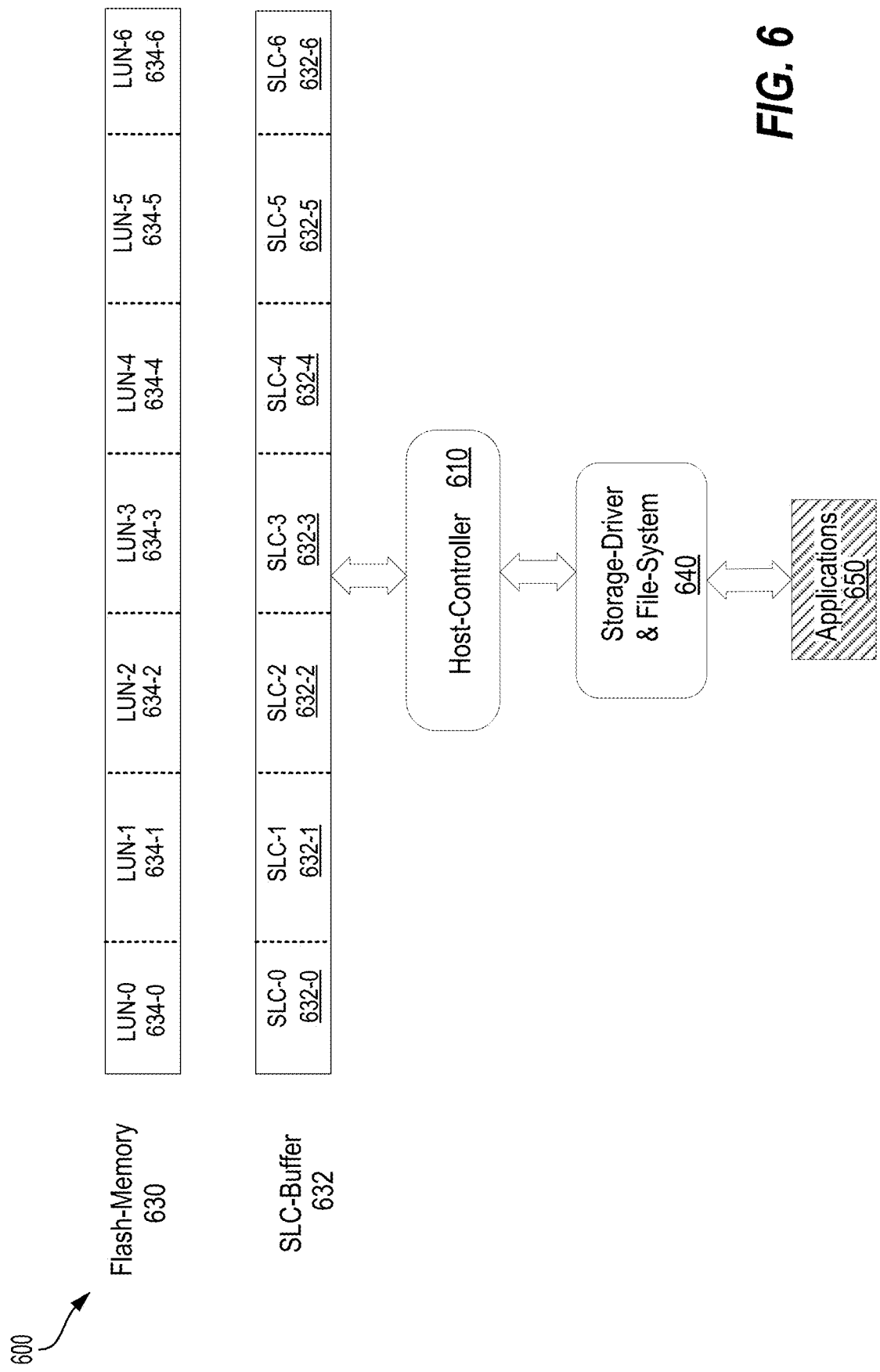
FIG. 6 is a block diagram illustrating a host controller and universal flash storage (UFS) system configuration including turbo-write buffers, according to aspects of the present disclosure.

FIG. 6 is a block diagram illustrating a universal flash storage system configuration 600 including turbo-write buffers 632 and a host controller 610, according to aspects of the present disclosure. This configuration includes turbo-write buffers 632 (632-0, 632-1, . . . , 632-6), in which seven (7) of the turbo-write buffers 632 are shown. In addition, seven (7) logical unit numbers (LUNs) are defined (e.g., LUN #0 634-0, LUN #1 634-1, LUN #2 634-2, LUN #3 634-3, LUN #4 634-4, LUN #5 634-5, and LUN #6 634-6) for a universal flash storage system 630. A storage driver and file-system 640 and an application 650 are shown for accessing the universal flash storage system 630 through the turbo-write buffers 632, as further illustrated in FIG. 7.

FIG. 7 is a block diagram depicting shuffling of the turbo-write buffers of the host controller 610 and universal flash storage system configuration 600 of FIG. 6 to prevent deterioration of the turbo-write buffer health, according to aspects of the present disclosure. This aspect of the present disclosure provides a ranking system based on a performance index value that may be read-out of each of the turbo-write buffers 632. In this example, the turbo-write buffers 632 are initially assigned the same rank (e.g., Rank-1 or high performance level). That is, the initial performance (e.g., prior to use) of the turbo-write buffers 332 is the same in this example, but may be different according to aspects of the present disclosure.

As further shown in FIG. 7, the rank assigned to each of the turbo-write buffers 632 may be adjusted after a time period "T" from a previous assignment of the buffer rankings. For example, as shown in FIG. 7, the host controller 610 performs dummy write transactions in idle mode to capture a performance index (e.g., throughput) of each of the turbo-write buffers 632 at certain defined time intervals "T". If the performance of any one of the turbo-write buffers 632 is drastically failing, then the shuffling of the turbo-write buffers 632 is performed. For example, the storage driver and file-system 640 includes information about the mapped logical block addresses (LBAs) of the turbo-write buffers 632. In this example, the host controller 610 initiates shuffling by re-mapping the turbo-write buffer LBA to a new turbo-write buffer LBA.

For example, after the time period "T", the host controller 610 reads a performance index value from each of the turbo-write buffers 632 and updates the associated rank depending on the performance index value. In this example, based on the performance index value, the turbo-write buffer 632-0 (e.g., SLC-0) is downgraded from Rank-1 to Rank-4 (e.g., low performance level). Similarly, the rank of the turbo-write buffers 632-2 (e.g., SLC-2) and 632-3 (e.g., SLC-3) are downgraded from Rank-1 to Rank-2, while the rank of the turbo-write buffer 632-5 (e.g., SLC-5) is downgraded from Rank-1 to Rank-3. The downgrade from Rank-1 to Rank-4 of the turbo-write buffer 632-0 triggers shuffling to switch the turbo-write buffer 632-0 (e.g., the detected turbo-write buffer) with the turbo-write buffer 632-3 (e.g., the selected turbo-write buffer).

According to this aspect of the present disclosure, the turbo-write buffer (e.g., 632-0) associated with the LUN #0 634-0 is shuffled with the highest rank turbo-write buffer (e.g., 632-3) at every periodic check "T". In addition, the rest of the turbo-write buffers are shuffled rank-wise based on original equipment manufacturer (OEM) specific priority for the LUNs 634. Using this shuffling technique, the turbo-write buffers 632 are exercised equally and, hence, performance remains intact on all of the turbo-write buffers 632. That is, based on the performance index value readouts of the turbo-write buffers 632, the positions of the turbo-write buffers 632 are shifted to equally exercise the turbo-write buffers 632. In this example, the LUN #0 634-0 is the user space LUN, and the LUN #5 634-5 is the replay protected memory block (RPMB), which are the most exercised LUNs.

Figure 8:
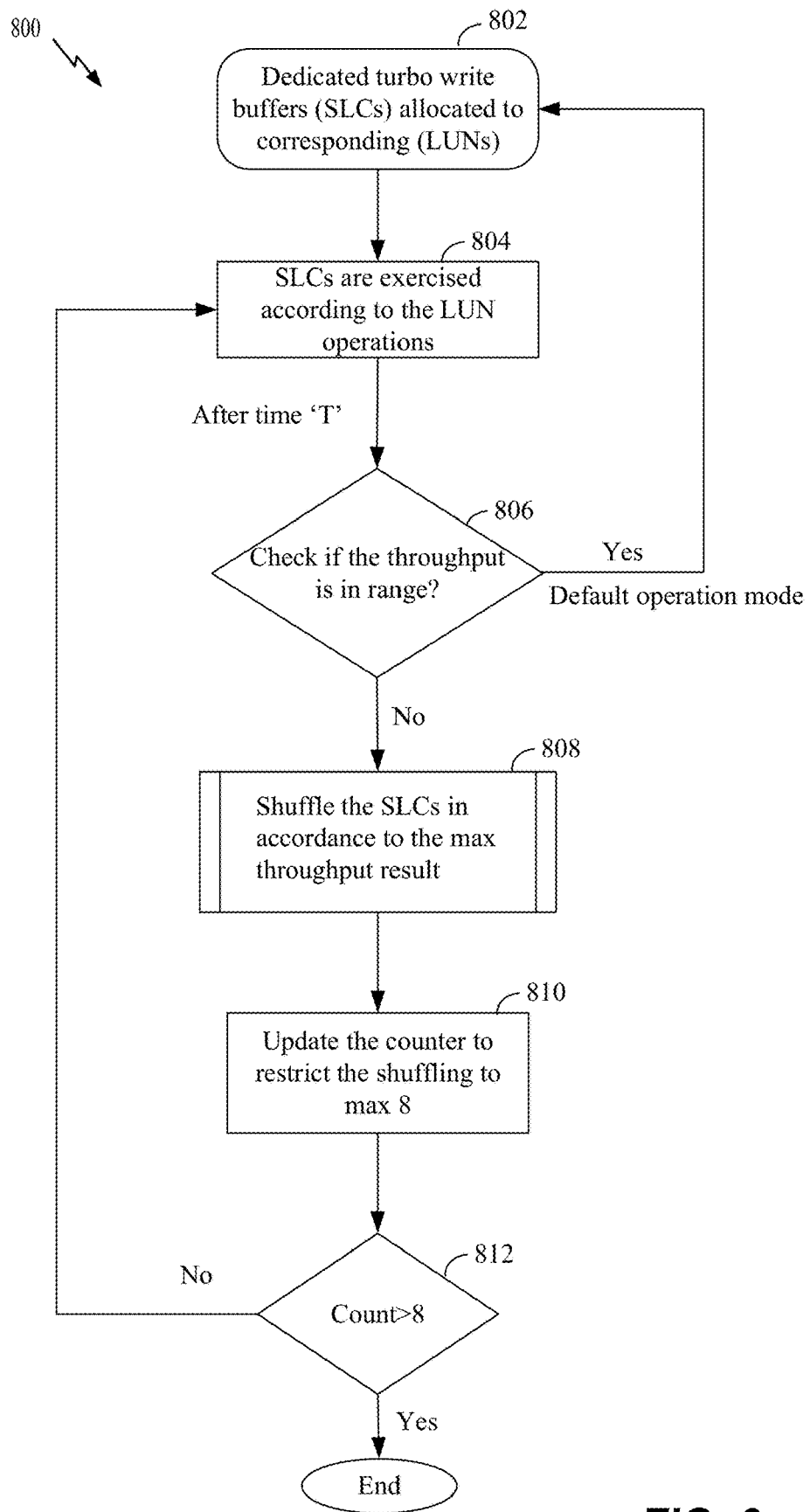
FIG. 8 is a flow diagram illustrating a method of shuffling turbo-write buffers of a universal flash storage (UFS) system, according to aspects of the present disclosure.

FIG. 8 is a flow diagram 800 illustrating a method of shuffling turbo-write buffers of a universal flash storage (UFS) system, according to aspects of the present disclosure. At block 802, a dedicated turbo-write buffer (e.g., single-level-cell (SLC)) is allocated to correspond to logical unit numbers (LUNs) used to identify the UFS device of a universal flash storage system. For example, as shown in FIG. 3, eight LUNs 334 are defined for the universal flash storage system 330. In addition, a turbo-write buffer 332 (332-0, 332-1, . . . , 332-7) is dedicated to each one of the LUNs 334 (334-0, 334-1, . . . , 334-7).

At block 804, the turbo-write buffers are exercised according to the write operations performed to their corresponding LUNs. For example, FIG. 4 shows the turbo-write buffer 332-0 associated with a user-space LUN (e.g., the LUN #0 334-0) that is used more than the other ones of the turbo-write buffers 332. After a time "T", a raw throughput check is performed for the user-space LUN relative to the turbo-write buffers. Over a time "T", cells of the turbo-write buffers begin deteriorating (e.g., due to the read disturb phenomenon). For example, FIG. 4 shows throughput deterioration of the turbo-write buffer 332-0 corresponding to the user space LUN (e.g., the LUN #0 334-0).

At block 806, it is determined if the throughput is in a normal range. When the throughput is in the normal range, control flow branches to block 802 according to a default operation mode. Otherwise, deteriorated throughput is detected and control flow branches to block 808. For example, as shown in FIG. 6, the host controller 610 initially captures the performance indicator of each of the turbo-write buffers 632 of a new universal flash storage device and uses these numbers as reference numbers. Now after the time "T", the host controller 610 performs dummy data transfers to the turbo-write buffers 632 during the idle mode and initiates the performance indexes (e.g., throughput) at time as defined in Equation (1):

$$T = T1 + T1 e^{at} + T1 e^{-at} \qquad (1)$$

T1=Initial timer value to initiate host controller;
a: Device characteristic parameter; and
t: Counter (1-7)

According to aspects of the present disclosure, the timer "T" is initiated at exponentially increasing intervals until a difference in throughput speed of the turbo-write buffers 632 is half of a threshold throughput speed. For example, the threshold throughput speed may be based on an initial performance index measured for each of the turbo-write buffers 632. After the difference in throughput speed of the turbo-write buffers 632 is half of the threshold throughput speed, the timer "T" is initiated at exponentially decreasing intervals, as the turbo-write buffers 632 become more susceptible to deterioration.

For example, an allowable speed threshold (e.g., a predetermined value) may be set at plus or minus ten percent (e.g., +/−10%). At an Nth check of the performance index values of the turbo-write buffers 632, a speed of the lowest rank buffer (e.g., SLC-0) is compared against half the threshold (e.g., +/−5%). If the speed of the lowest ranked buffer (e.g., SLC-0) is less than half the threshold (e.g., +/−5%), then a next timer "T" is initiated with an exponentially increasing interval (e.g., $T1e^{at}$). Otherwise, the next timer "T" is initiated with an exponentially decreasing interval (e.g., $T1e^{-at}$). As shown in Eq. (1), "T" is a representation of three individual functions. That is, "T" holds, at any point, the value result of one of the three functions of Eq. (1).

In operation, the host controller 610 compares the performance indexes (e.g., throughput) against a maximum allowable threshold and checks which of the turbo-write buffers 632 gives the better rank. For example, in FIG. 7, after the time interval "T", the turbo-write buffers 632-3 (e.g., SLC-3), 632-4 (e.g., SLC-4), and 632-6 (e.g., SLC-6) maintain the highest rank (e.g., Rank-1). Referring again to FIG. 8, at block 808, the turbo-write buffers (e.g., SLCs) are shuffled according to a maximum throughput result. As shown in FIG. 7, the turbo-write buffer (e.g., 632-0) associated with the LUN #0 634-0 is shuffled with the highest ranked turbo-write buffer (e.g., 632-3) at the periodic check "T". In addition, the rest of the turbo-write buffers are shuffled rank-wise based on an OEM specific priority for the LUNs 634.

At block 810, a counter (t) is updated to restrict shuffling to a maximum value of eight (8). At block 812, the counter t is compared with the maximum value. When the counter t is less than the maximum value, control flow branches to block 804. Otherwise, the process terminates. Using this shuffling technique of FIG. 8, the turbo-write buffers 632 are exercised equally and, hence, performance remains intact on all of the turbo-write buffers 632. That is, the positions of the turbo-write buffers 632 are shifted to equally exercise the turbo-write buffers 632. As shown in FIG. 7, the LUN #0 634-0 is the user space LUN, and the LUN #5 634-5 is the replay protected memory block (RPMB), which are the most exercised LUNs.

Figure 9:
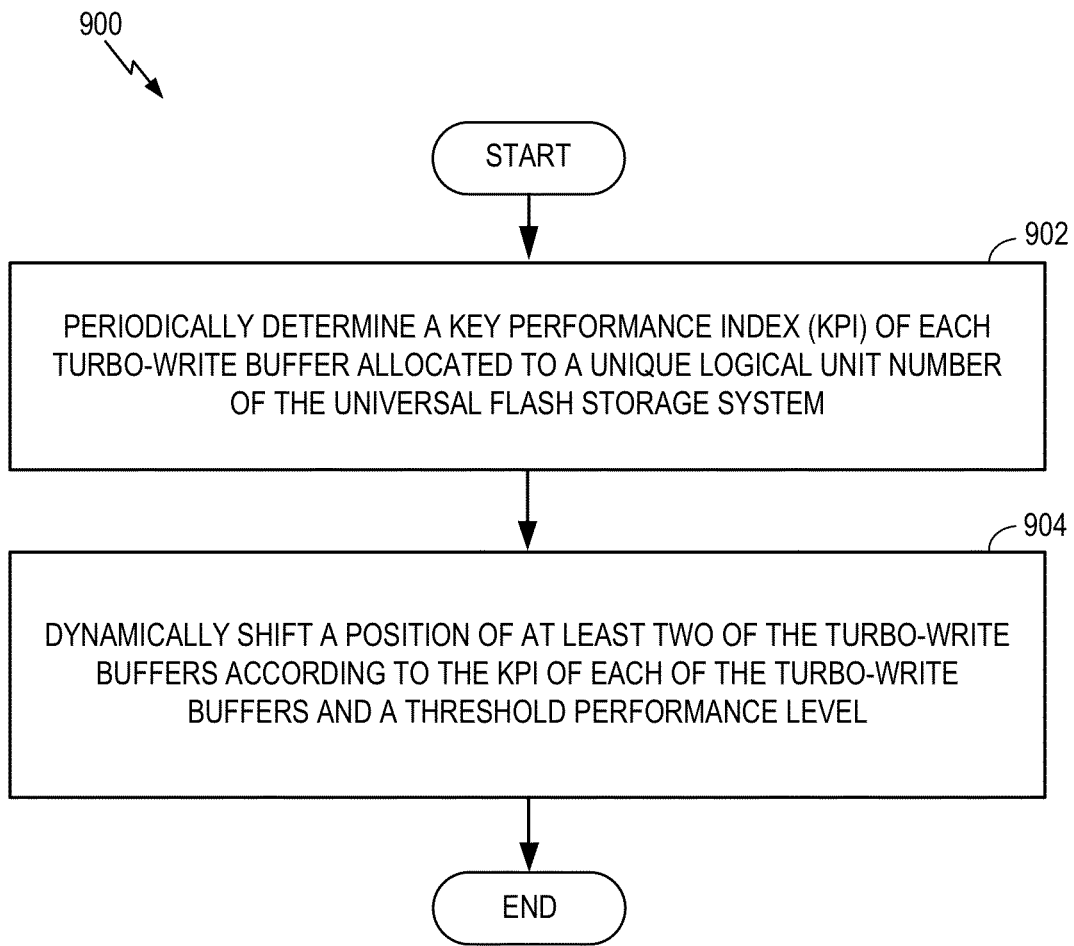
FIG. 9 is a flow diagram illustrating a method of shuffling turbo write buffers of a universal flash storage (UFS) system, according to aspects of the present disclosure.

FIG. 9 is a flow diagram 900 illustrating a method of shuffling turbo-write buffers of a universal flash storage (UFS) system, according to aspects of the present disclosure. The method begins at block 902, in which a performance index of each turbo-write buffer allocated to a unique logical unit number (LUN) of the universal flash storage system is periodically determined. For example, as shown in FIG. 7, after the time period "T", the host controller 610 reads a performance index value from each of the turbo-write buffers 632 and updates the associated rank depending on the performance index value.

Referring again to FIG. 9, at block 904, a position of at least two of the turbo-write buffers is shifted according to the performance index of each of the turbo-write buffers and a threshold performance level. For example, in FIG. 7, the turbo-write buffer (e.g., 632-0) associated with the LUN #0 634-0 is shuffled with the highest rank turbo-write buffer (e.g., 632-3) at the periodic time interval "T". In addition, the rest of the turbo-write buffers are shuffled rank-wise based on OEM specific priority for the LUNs 634. Using this shuffling technique, the turbo-write buffers 632 are exercised equally and, hence, performance remains intact on all of the turbo-write buffers 632.

According to a further aspect of the present disclosure, a turbo-write buffer for of a universal flash storage (UFS) system is described. The UFS system may include means for periodically determining a performance index of each turbo-write buffer allocated to a unique logical unit number of the universal flash storage system, and/or means for shifting a position of at least two of the turbo-write buffers according to the performance index of each of the turbo-write buffers and a threshold performance level. The periodically determining means and/or the shifting means may be the host-controller 310/610, the storage-driver and file-system 640 of FIG. 6. In another aspect, the aforementioned means may be any module or apparatus configured to perform the functions recited by the aforementioned means.

Figure 10:
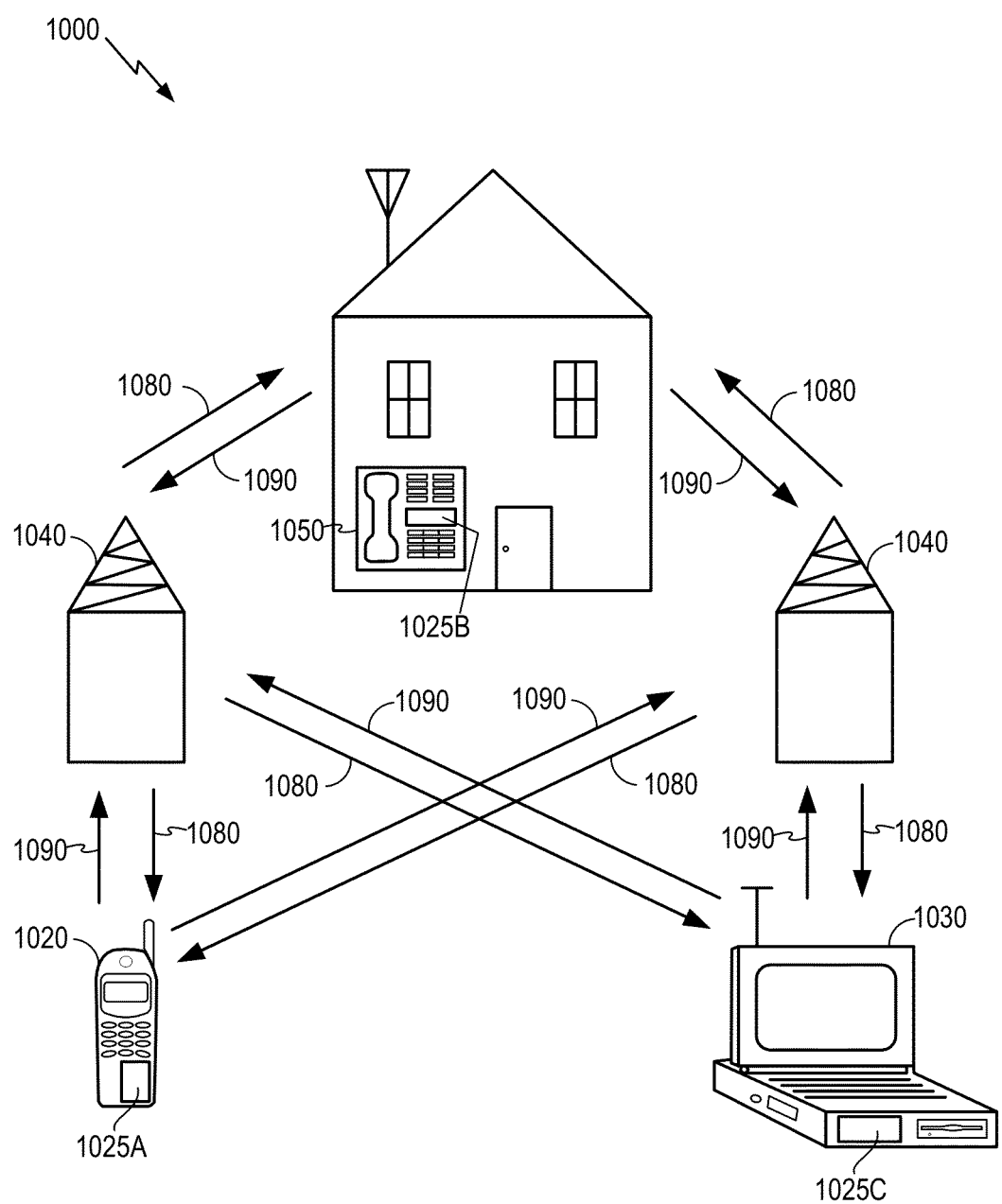
FIG. 10 is a block diagram showing a wireless communications system in which a configuration of the disclosure may be advantageously employed.

FIG. 10 is a block diagram showing an exemplary wireless communications system 1000 in which a configuration of the disclosure may be advantageously employed. For purposes of illustration, FIG. 10 shows three remote units 1020, 1030, and 1050 and two base stations 1040. It will be recognized that wireless communications systems may have many more remote units and base stations. Remote units 1020, 1030, and 1050 include IC devices 1025A, 1025B, and 1025C, which include the disclosed UFS turbo-write buffers. It will be recognized that any device containing an IC may also include the disclosed UFS turbo-write buffers, including the base stations, switching devices, and network equipment. FIG. 10 shows forward link signals 1080 from the base stations 1040 to the remote units 1020, 1030, and 1050, and reverse link signals 1090 from the remote units 1020, 1030, and 1050 to the base stations 1040.

In FIG. 10, a remote unit 1020 is shown as a mobile telephone, a remote unit 1030 is shown as a portable computer, and a remote unit 1050 is shown as a fixed location remote unit in a wireless local loop system. For example, the remote units may be a mobile phone, a hand-held personal communications systems (PCS) unit, a portable data unit such as a personal data assistant, a GPS enabled device, a navigation device, a set top box, a music player, a video player, an entertainment unit, a fixed location data unit such as meter reading equipment, or any other device that stores or retrieves data or computer instructions, or any combination thereof. For example, a remote unit including the UFS turbo-write buffers may be integrated within a vehicle control system, a server computing system, or other like system specifying critical data integrity. Although FIG. 10 illustrates IC devices 1025A, 1025B, and 1025C, which include the disclosed UFS turbo-write buffers, the disclosure is not limited to these exemplary illustrated units. Aspects of the present disclosure may be suitably employed in any device, which includes the UFS turbo-write buffers.

For a firmware and/or software implementation, the methodologies may be implemented with modules (e.g., procedures, functions, and so on) that perform the described functions. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, non-volatile, or other memory and is not to be limited to any particular type of memory or number of memories, or type of media upon which memory is stored.

If implemented in firmware and/or software, the functions may be stored as one or more instructions or code on a non-transitory computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer. Disk and disc, as used herein, include compact disc (CD), laser disc, optical disc, digital versatile disc (DVD) and Blu-ray© disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein, may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communications media including any medium that facilitates transfer of a computer program from one place to another. A storage media may be any available media that can be accessed by a general-purpose or special-purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD) and Blu-ray© disc, where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "a step for."

What is claimed is:

1. A method of shuffling turbo-write buffers of a universal flash storage system, the method comprising:
   periodically determining a performance index of each turbo-write buffer allocated to a unique logical unit number of the universal flash storage system; and
   shifting a position of at least two of the turbo-write buffers according to the performance index of each of the turbo-write buffers and a threshold performance level.

2. The method of claim 1, further comprising:
   allocating a dedicated turbo-write buffer to each unique logical unit number of the universal flash storage system; and setting a time interval "T" to periodically request the performance index of each of the turbo-write buffers.

3. The method of claim 2, further comprising:
performing a dummy write transaction to each of the turbo-write buffers to determine the performance index of the turbo-write buffers during an idle mode;
assigning a rank to each of the turbo-write buffers according to their respective performance index value;
increasing the time interval "T" when a performance of each of the turbo-write buffers is greater than a predetermined value; and
decreasing the time interval "T" when the performance of one of the turbo-write buffers is less than the predetermined value.

4. The method of claim 1, in which shifting comprises swapping the turbo-write buffer having a highest use with the turbo-write buffer having a lowest use.

5. The method of claim 1, in which shifting comprises:
detecting a turbo-write buffer exhibiting a low performance level;
selecting a turbo-write buffer having a high performance level; and
switching positions of the detected turbo-write buffer and the selected turbo-write buffer.

6. The method of claim 5, in which switching positions comprises remapping the logical unit numbers associated with the detected turbo-write buffer and the selected turbo-write buffer.

7. A non-transitory computer-readable medium having program code recorded thereon for shuffling turbo-write buffers of a universal flash storage system, the program code executed by a processor and comprising:
program code to periodically determine a performance index of each of the turbo-write buffers allocated to the unique logical unit number of the universal flash storage system; and
program code to shift a position of at least two of the turbo-write buffers according to the performance index of each of the turbo-write buffers and a threshold performance level.

8. The non-transitory computer-readable medium of claim 7, further comprising:
program code to allocate a dedicated turbo-write buffer to each unique logical unit number of the universal flash storage system; and
program code to set a time interval "T" to periodically request the performance index of each of the turbo-write buffers.

9. The non-transitory computer-readable medium of claim 8, further comprising:
program code to perform a dummy write transaction to each of the turbo-write buffers to determine the performance index of the turbo-write buffers during an idle mode;
program code to assign a rank to each of the turbo-write buffers according to their respective performance index value;
program code to increase the time interval "T" when a performance of each of the turbo-write buffers is greater than a predetermined value; and
program code to decrease the time interval "T" when the performance of one of the turbo-write buffers is less than the predetermined value.

10. The non-transitory computer-readable medium of claim 7, in which the program code to shift further comprises program code to swap the turbo-write buffer having a highest use with the turbo-write buffer having a lowest use.

11. The non-transitory computer-readable medium of claim 7, in which the program code to shift further comprises:
program code to detect a turbo-write buffer exhibiting a low performance level;
program code to select a turbo-write buffer having a high performance level; and
program code to switch positions of the detected turbo-write buffer and the selected turbo-write buffer.

12. The non-transitory computer-readable medium of claim 11, in which the program code to switch positions further comprises program code to remap the logical unit numbers associated with the detected turbo-write buffer and the selected turbo-write buffer.

13. A apparatus configured to shuffle turbo-write buffers of a universal flash storage (UFS) system, the apparatus comprising:
a memory comprising turbo-write buffers allocated to unique logical unit numbers of the UFS system; and
at least one processor coupled to the memory, the processor configured:
to periodically determine a performance index of each of the turbo-write buffers allocated to the unique logical unit numbers of the universal flash storage system; and
to shift a position of at least two of the turbo-write buffers according to the performance index of each of the turbo-write buffers and a threshold performance level.

14. The apparatus of claim 13, in which the processor is further configured:
to allocate a dedicated turbo-write buffer to each of the unique logical unit numbers of the universal flash storage system; and
to set a time interval "T" to periodically request the performance index of each of the turbo-write buffers.

15. The apparatus of claim 14, in which the processor is further configured:
to perform a dummy write transaction to each of the turbo-write buffers to determine the performance index of the turbo-write buffers during an idle mode;
to assign a rank to each of the turbo-write buffers according to their respective performance index value;
to increase the time interval "T" when a performance of each of the turbo-write buffers is greater than a predetermined value; and
to decrease the time interval "T" when the performance of one of the turbo-write buffers is less than the predetermined value.

16. The apparatus of claim 13, in which to shift the processor is further configured to swap the turbo-write buffer having a highest use with the turbo-write buffer having a lowest use.

17. The apparatus of claim 13, in which to shift the processor is further configured:
to detect a turbo-write buffer exhibiting a low performance level;
to select a turbo-write buffer having a high performance level; and
to switch positions of the detected turbo-write buffer and the selected turbo-write buffer.

18. The apparatus of claim 17, in which to switch positions the processor is further configured to remap the logical unit numbers associated with the detected turbo-write buffer and the selected turbo-write buffer.

19. The apparatus of claim 13, further comprising one of a computing system, mobile computing device, Internet of Things device, or virtual reality or augmented reality system, incorporating the processor and the memory.

\* \* \* \* \*